United States Patent
Rieger

(10) Patent No.: US 12,098,700 B2
(45) Date of Patent: Sep. 24, 2024

(54) METHOD FOR MONITORING THE STATE OF THE POWERTRAIN OR TOWER OF A WIND TURBINE, AND WIND TURBINE

(71) Applicant: VC VIII POLYTECH HOLDING APS, Bramming (DK)

(72) Inventor: Florian Rieger, Munich (DE)

(73) Assignee: VC VIII POLYTECH HOLDING APS, Bramming (DK)

( * ) Notice: Subject to any disclaimer, the term of this patent is extended or adjusted under 35 U.S.C. 154(b) by 29 days.

(21) Appl. No.: 17/801,489

(22) PCT Filed: Feb. 15, 2021

(86) PCT No.: PCT/EP2021/053602
§ 371 (c)(1),
(2) Date: Aug. 22, 2022

(87) PCT Pub. No.: WO2021/170434
PCT Pub. Date: Sep. 2, 2021

(65) Prior Publication Data
US 2023/0220835 A1 Jul. 13, 2023

(30) Foreign Application Priority Data
Feb. 23, 2020 (DE) .................... 102020105053.4

(51) Int. Cl.
*F03D 17/00* (2016.01)
(52) U.S. Cl.
CPC .......... *F03D 17/00* (2016.05); *F05B 2260/80* (2013.01); *F05B 2270/334* (2013.01); *F05B 2270/342* (2020.08); *F05B 2270/804* (2013.01)
(58) Field of Classification Search
CPC ................ F03D 17/00; F05B 2270/334; F05B 2270/804; Y02E 10/72
See application file for complete search history.

(56) References Cited

U.S. PATENT DOCUMENTS

| 4,800,267 A | * | 1/1989 | Freal | ..................... G01V 1/181 |
| | | | | 250/227.16 |
| 6,940,186 B2 | * | 9/2005 | Weitkamp | ............... F03D 7/042 |
| | | | | 290/55 |

(Continued)

FOREIGN PATENT DOCUMENTS

| DE | 102011117468 A1 | 5/2013 |
| DE | 202013007142 U1 | 8/2013 |

(Continued)

OTHER PUBLICATIONS

International Search Report and partial translation for corresponding PCT/EP2021/053602, dated Apr. 29, 2021, 10 pages.

*Primary Examiner* — Pedro J Cuevas
(74) *Attorney, Agent, or Firm* — Crowell & Moring LLP

(57) ABSTRACT

Embodiments according to the invention describe a method for monitoring the state of the powertrain or tower of a wind turbine (10), said method having the steps of: detecting data of a state monitoring system which is provided for a structure of the wind turbine (10), said structure being mechanically coupled to the powertrain or tower; processing the detected data of the state monitoring system which is provided for the structure of the wind turbine (10), said structure being mechanically coupled to the powertrain or tower; and determining the state of the powertrain or tower from the processed data of the state monitoring system which is provided for the structure of the wind turbine (10), said structure being mechanically coupled to the powertrain or tower.

16 Claims, 3 Drawing Sheets

(56) References Cited

U.S. PATENT DOCUMENTS

| | | | | |
|---|---|---|---|---|
| 7,854,589 B2* | 12/2010 | Nielsen | F03D 7/0296 | 416/61 |
| 7,919,880 B2* | 4/2011 | Nielsen | F03D 7/0212 | 290/55 |
| 7,952,217 B2* | 5/2011 | Nielsen | F03D 7/0224 | 290/55 |
| 8,362,632 B2* | 1/2013 | Nielsen | F03D 7/0204 | 290/55 |
| 9,316,571 B2* | 4/2016 | Müller | G01P 15/093 | |
| 9,447,778 B2* | 9/2016 | Caponetti | F03D 17/00 | |
| 10,107,261 B2* | 10/2018 | Zheng | F03D 7/042 | |
| 10,295,436 B2* | 5/2019 | Conner | G01B 11/00 | |
| 10,344,740 B2* | 7/2019 | Caponetti | F03D 7/042 | |
| 10,422,321 B2* | 9/2019 | Müller | F03D 17/00 | |
| 10,655,601 B2* | 5/2020 | Müller | F03D 7/042 | |
| 11,098,698 B2* | 8/2021 | Perley | F03D 9/25 | |
| 11,105,318 B2* | 8/2021 | Schauss | F03D 1/0675 | |
| 11,174,841 B2* | 11/2021 | Stähler | F03D 7/048 | |
| 11,215,447 B2* | 1/2022 | Nawrot | G01L 1/06 | |
| 11,371,486 B2* | 6/2022 | Schmid | G01B 11/16 | |
| 11,448,195 B2* | 9/2022 | Mai | F03D 80/40 | |
| 11,732,696 B2* | 8/2023 | Albisu Iso | F03D 17/00 | 290/44 |
| 2009/0185901 A1* | 7/2009 | Nielsen | F03D 7/0296 | 416/31 |
| 2009/0200804 A1* | 8/2009 | Nielsen | F03D 7/0212 | 290/44 |
| 2010/0119370 A1* | 5/2010 | Myhr | F03D 80/40 | 416/169 R |
| 2010/0301604 A1* | 12/2010 | Nielsen | F03D 7/0204 | 290/44 |
| 2010/0301605 A1* | 12/2010 | Nielsen | F03D 7/0224 | 290/44 |
| 2011/0274386 A1* | 11/2011 | Bosselmann | G01H 9/004 | 385/12 |
| 2013/0110414 A1* | 5/2013 | Caponetti | F03D 7/042 | 702/35 |
| 2013/0195657 A1* | 8/2013 | Lauritsen | F01D 25/00 | 416/61 |
| 2013/0272874 A1* | 10/2013 | Hess | F03D 17/00 | 416/61 |
| 2014/0015251 A1* | 1/2014 | Hammerum | F03D 80/30 | 290/44 |
| 2015/0211969 A1* | 7/2015 | Muller | G01M 11/083 | 73/849 |
| 2016/0305403 A1* | 10/2016 | Zheng | F03D 7/0296 | |
| 2016/0356266 A1* | 12/2016 | Koerber | F03D 7/044 | |
| 2017/0009739 A1* | 1/2017 | Caponetti | F03D 7/042 | |
| 2017/0268486 A1* | 9/2017 | Müller | F03D 7/042 | |
| 2017/0292501 A1* | 10/2017 | Perley | F03D 17/00 | |
| 2017/0335828 A1* | 11/2017 | Müller | F03D 17/00 | |
| 2019/0003454 A1* | 1/2019 | Müller | F03D 7/0224 | |
| 2019/0203698 A1* | 7/2019 | Müller | F03D 17/00 | |
| 2019/0203699 A1* | 7/2019 | Müller | F03D 17/00 | |
| 2020/0064122 A1* | 2/2020 | Nawrot | G01B 11/18 | |
| 2020/0132052 A1* | 4/2020 | Schmid | G01H 9/004 | |
| 2020/0217300 A1* | 7/2020 | Stähler | F03D 17/00 | |
| 2020/0224640 A1* | 7/2020 | Schmid | G01L 1/242 | |
| 2020/0332774 A1* | 10/2020 | Schauss | F03D 1/0675 | |
| 2020/0386206 A1* | 12/2020 | Schauss | F03D 7/048 | |
| 2023/0220835 A1* | 7/2023 | Rieger | F03D 17/00 | 290/44 |
| 2023/0258154 A1* | 8/2023 | Hong | F03D 80/40 | 416/39 |
| 2023/0272783 A1* | 8/2023 | Brenner | F03D 80/40 | 702/60 |
| 2023/0349944 A1* | 11/2023 | Kienitz | G01P 15/18 | |

FOREIGN PATENT DOCUMENTS

| | | |
|---|---|---|
| DE | 102013223294 A1 | 5/2015 |
| EP | 2565444 A1 | 3/2013 |
| WO | WO 2015/028153 A1 | 3/2015 |

* cited by examiner

METHOD FOR MONITORING THE STATE OF THE POWERTRAIN OR TOWER OF A WIND TURBINE, AND WIND TURBINE

CROSS-REFERENCE TO RELATED APPLICATIONS

This application is a national stage application under 35 U.S.C. § 371, which claims priority to PCT application Serial No. PCT/EP2021/053602, filed Feb. 15, 2021, and to DE 10 2020 105053.4 filed Feb. 26, 2020, each of which is incorporated by reference herein in its entirety.

TECHNICAL FIELD

The present disclosure relates to a method for monitoring the state of a powertrain or tower of a wind turbine as well as a wind turbine. The invention particularly relates to a wind turbine and a method associated thereto, which, for example, has sensors on a structure and a state of another mechanically coupled structure can be monitored with these sensor data.

TECHNICAL BACKGROUND

It is known that gathering of data from the wind turbine is conducive to a reasonable and safe operation of the wind turbine and a wind farm, respectively. An example is data for measuring the wind velocity which are used for controlling the blade angle adjustment or in case that the wind velocity becomes too high, for stopping the rotor and the plant, respectively, in order to protect the plant against damage.

Data from a plurality of sensors can be gathered on the wind turbine. In general, it appears desirable to detect as many data as possible regarding a wind turbine in order to be able to make the best-possible prediction about the state of the wind turbine.

However, in practice, only the fewest wind turbines are equipped with a complete sensor set. Thus, not all wind turbines have sensors on all relevant parts. Besides, it would also be desirable to establish redundancy.

Therefore, it is worthwhile to improve wind turbine and wind farms in such a manner that a state of relevant parts can be monitored.

ABSTRACT

Embodiments of the present disclosure provide a method for monitoring the state of a powertrain or tower of a wind turbine according to claim 1 and a wind turbine according to claim 7.

According to an embodiment of the present disclosure, a method for monitoring the state of a powertrain or tower of a wind turbine is provided. The method comprises detecting data of a state monitoring system, wherein the state monitoring system is provided for a structure of the wind turbine which is mechanically coupled to the powertrain or tower; processing the detected data of the state monitoring system which is provided for the structure of the wind turbine which is mechanically coupled to the powertrain or tower; and determining a state of the powertrain or tower from the processed data of the state monitoring system which is provided for the structure of the wind turbine which is mechanically coupled to the powertrain or tower.

According to a further embodiment of the present disclosure, a wind turbine is provided. The wind turbine comprises at least one powertrain and a tower; a state monitoring system, wherein the state monitoring system is provided for a structure of the wind turbine which is mechanically coupled to the powertrain or tower, and a data processing device which is configured to carry out a method for state monitoring of a powertrain or tower of a wind turbine. The method comprises detecting data of a state monitoring system, wherein the state monitoring system is provided for a structure of the wind turbine which is mechanically coupled to the powertrain or tower; processing the detected data of the state monitoring system which is provided for the structure of the wind turbine which is mechanically coupled to the powertrain or tower; and determining a state of the powertrain or tower from the processed data of the state monitoring system which is provided for the structure of the wind turbine which is mechanically coupled to the powertrain or tower.

BRIEF DESCRIPTION OF THE DRAWINGS

Embodiments of the invention are illustrated in the drawings and will be explained in more detail in the following description. In the drawings.

DESCRIPTION OF EMBODIMENTS

Figure 1:
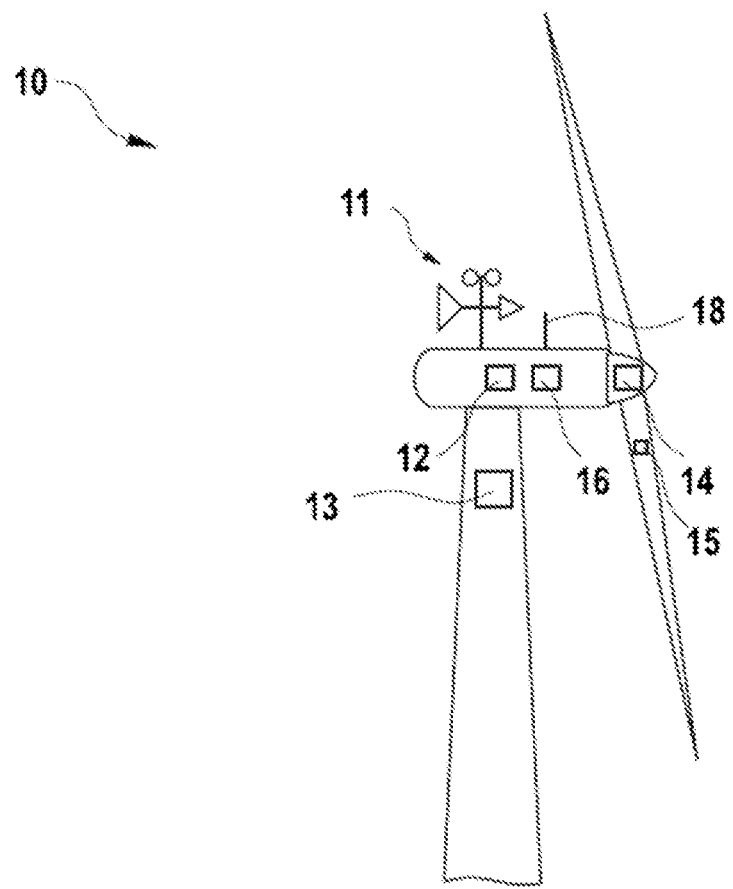
FIG. 1 shows an exemplified wind turbine according to embodiments.

Embodiments of the present disclosure will be explained in more detail in the following. The drawings serve to illustrate one or more examples of embodiments. In the drawings, the same reference numerals designate the same or similar features of the respective embodiments. Features which are described as part of an embodiment can also be used in connection with another embodiment and thus form a further embodiment.

Embodiments described herein can monitor or determine the state of a structure by detecting data of a structure which is mechanically coupled to this structure. Embodiments described herein enable in particular the state monitoring of a powertrain or tower of a wind turbine by means of a state monitoring system which is connected for a structure which is mechanically coupled to the powertrain or tower. This system is in particular advantageous for wind turbines which have no monitoring system for the powertrain and/or the tower and/or a redundancy for those needs to be established. A further, additional monitoring system can also be desirable which, for example, has a higher data rate and/or data depth, is easily accessible and/or is better integrated into the system of the wind turbine.

According to embodiments described herein, the vibrations on the powertrain or tower can, for example, also be measured indirectly in the rotor instead of measuring these vibrations directly on the powertrain or tower.

In particular, measured natural frequencies can be classified on the rotor blades or on another mechanically coupled structure. The natural frequencies measured on this structure can be divided into blade natural frequencies, tower natural frequencies, powertrain natural frequencies and so forth. The frequencies classified as power train natural frequencies can then be monitored for changes both in terms of the frequency values and the amplitudes and mode shapes. The same can be done analogously to the tower.

FIG. 1 shows an exemplified wind turbine 10. By way of example, several sensors 11, 12, 13, 14, 15 are arranged on the wind turbine 10 according to FIG. 1. The sensors 11, 12, 13, 14 15 can detect data. The data can be relevant pertaining to the operation of the wind turbine. Furthermore, a data processing device 16 can be provided. The data processing device 16 can process the data detected. The data processed can be transmitted via a network interface 18. The network interface 18 can particularly be configured for connecting the data processing device to a data network. The network interface can be configured to send data processed by the data processing device 16 to an online-based storage and server service, for example. The data processing device 16 can use and/or be a digital processing unit ("DPU"), for example.

Sensors 12, 13, 14 15 can be sensors which receive measurement data of a wide range of parameters, for example, of a rotor, of a transmission and/or in general of (another) structure, such as for example a tower, on the wind power plant. One or more sensors 11, 12, 13, 14 15 can be arranged on a wind turbine. Consequently, the present disclosure, unless otherwise indicated, always proceeds from at least one sensor or a combination of several sensors, also when "sensor" is only used in singular for simplicity.

Thus, according to embodiments described herein, a sensor 11, 12, 13, 14, 15 can be arranged on the wind turbine. The sensor 11, 12, 13, 14, 15 can be arranged on a rotor blade of the wind turbine, on a turbine of the wind turbine, on a transmission of the wind turbine, on a tower of the wind turbine and so forth or can be an external sensor.

The sensor 11, 12, 13, 14, 15 can be an optical sensor, for example. According to embodiments described herein, the sensor 12, 13, 14, 15 can be a fiber optical sensor. In particular, the sensor 12, 13, 14, 15 can be a fiber optical strain sensor or acceleration sensor. The sensor 12, 13, 14, 15 can measure in one, two, three or more than three axes. The sensor can particularly be a 2D or 3D sensor.

The sensor 11, 12, 13, 14, 15 can be connected to a data processing device 16. The sensor 11, 12, 13, 14, 15 can, for example, be connected to the data processing device 16 via a wired or a wireless link. If the sensor 11, 12, 13, 14, 15 and the data processing device 16 are arranged on parts, which are moveable against each other, of the wind turbine 10, such as for example the rotor and the nacelle, a wireless link can be advantageous. A wireless link can be realised via radio, in particular via a Bluetooth standard or WLAN standard, for example.

According to embodiments described herein, the wind turbine 10 can have a sensor 15 on a rotor blade. In particular, a sensor can be provided for each rotor blade 15. The sensors 15 can be parts of a state monitoring system for the rotor blades and/or the rotor. The rotor and the rotor blades constitute a structure which is mechanically coupled to the tower and/or the powertrain. The data processing device 16 can provide a monitoring of the state of the powertrain or tower of the wind turbine by means of data from the state monitoring system of the mechanically coupled structure. In particular, the data processing device 16 can detect data of a state monitoring system, wherein the state monitoring system is provided for a structure of the wind turbine which is mechanically coupled to the powertrain or tower. Furthermore, the data processing device 16 can be configured to process the detected data of the state monitoring system which is provided for the structure of the wind turbine which is mechanically coupled to the powertrain or tower. The data processing device 16 can also detect a state of the powertrain or tower from the processed data of the state monitoring system which is provided for the structure of the wind turbine which is mechanically coupled to the powertrain or tower.

As an alternative or in addition, the data processing device 16 can send the detected data via the network interface 18 so that the further processing of the data not (only) takes place directly in the wind turbine 10.

According to embodiments described herein, the at least one sensor 11, 12, 13, 14, 15 can be arranged on at least one rotor blade, a rotor or a hub of the wind turbine. The sensor 15 is preferably arranged on a rotor blade. According to embodiments described herein, the sensor 11, 12, 13, 14, 15 can be a fiber optical sensor. According to embodiments described herein, the sensor 11, 12, 13, 14, 15 can be a vibration sensor or acceleration sensor. In particular, the sensor 11, 12, 13, 14, 15 can be a 2D or 3D acceleration sensor.

According to embodiments described herein, the data processing device 16 can be configured to determine natural frequencies and/or to determine a change of natural frequencies. In particular, the natural frequencies can be determined by the structures, to which a sensor is connected and/or to which a sensor is attached as well as by structures which are mechanically coupled to these structures, and monitored for changes. A change in an amplitude and/or a mode shape of the natural frequencies can be monitored, for example.

According to embodiments described herein, the monitoring can also lead to the fact that a deviation of the wind turbine can be determined by a normal behaviour. For example, the data of the sensors can be utilized to find if these are in a normal range. As an alternative or in addition, the deviation of the wind turbine can also be performed by a normal behaviour based on the natural frequencies. In particular, normal operation states can be classified based on natural frequencies in contrast to abrupt, abnormal states and a trend behaviour can be identified.

According to embodiments described herein, the natural frequencies can be classified as powertrain natural frequencies or tower natural frequencies and monitored for changes. For this purpose, the monitoring system can, in particular, be used for a mechanically coupled structure.

Figure 2:
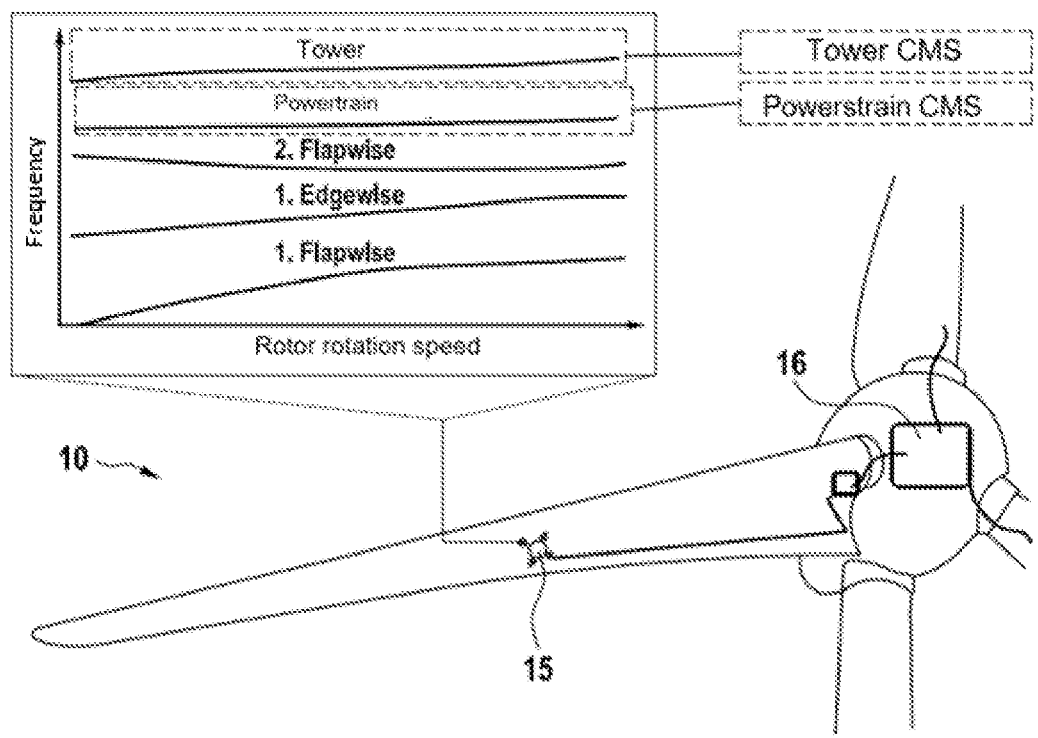
FIG. 2 shows a section of an exemplified wind turbine as well as a diagram for illustrating natural frequency ranges according to embodiments.

FIG. 2 shows a section of an exemplified wind turbine 10 as well as a diagram for illustrating natural frequency ranges according to embodiments.

FIG. 2 shows, for example, the sensor 15 that is arranged on a rotor blade and the data processing device 16. Besides, FIG. 2 shows a diagram for illustrating the frequencies which are detected with the sensor 15, via the rotor rotation speed. For example, the diagram shows five tracks which are distinguishable from each other. The lower three tracks (1. Flapwise, 1. Edgewise, 2. Flapwise) can be assigned to the rotor and rotor blades, respectively. The second track from above can be assigned to the powertrain. The topmost track can be assigned to the tower.

As shown by FIG. 2, the detected data of a state monitoring system of a structure can also be used for monitoring of the state of a structure which is mechanically coupled thereto. In particular, FIG. 2 shows that the data of the state monitoring system of the rotor can permit a monitoring of the state of the powertrain or tower.

In general, the expected values for the natural frequencies may depend on different factors, such as for example the type and/or buildup of the wind turbine 10. Typically, the tower natural frequencies can lie between the rotor frequency (1P) and the excitation frequency through the passing rotor blades (3P). This can particularly be the case in case of a so-called Soft-Tower. In rarer cases, the "Soft-Soft"-Tower is used in which the tower natural frequencies lie below the 1P rotor frequency.

According to embodiments described herein, frequencies in the range up to 10 Hz can be used for monitoring the tower natural frequency. In particular, the frequencies can be classified in a range between 0.25 and 2 Hz as tower natural frequency.

According to embodiments described herein, one above the tower and rotor blade frequencies can be used for monitoring the tower and powertrain natural frequencies. Typical generator rotation speeds can lie between 900 and 2000 revolutions per minute. Therefore, in particular frequencies from 15 Hz (1P of the generator) and the multiple thereof are used for monitoring the powertrain natural frequency and/or are classified as the powertrain natural frequency.

According to embodiments described herein, a categorisation of the natural frequencies can take place through the magnitude of the frequency, the amplitude and/or the damping value as well as through analysis of the mode shapes and/or directions. Moreover, a further categorisation can be performed by comparing the natural frequencies, which have been measured, between the blades. Frequencies which are measured the same way on all three blades (the same frequency, amplitude and phase), do not normally derive from the blades themselves, but from one of the mechanically coupled structures. Typically, lower frequencies rather derive from the tower and the parts of the powertrain before the transmission. Higher frequencies typically derive from the transmission and from the generator.

According to embodiments described herein, a frequency measurement can also take place in the hub of the rotor, for example by the sensor 11, 12, 13, 14, 15. In addition or as an alternative a categorisation can be made by comparing the frequencies which are measured in the hub to the frequencies which are measured in the blade.

Figure 3:
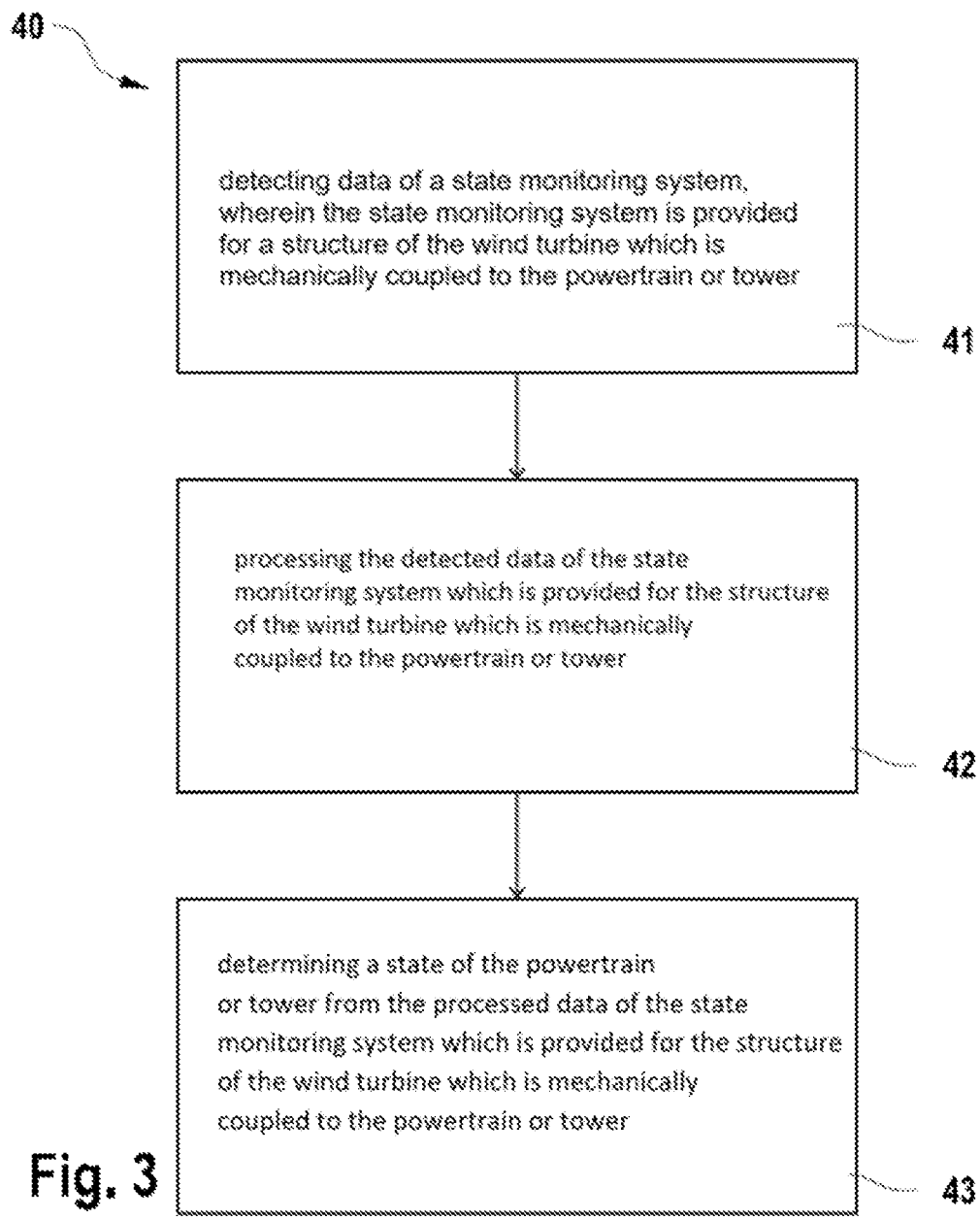
FIG. 3 shows a flow chart for illustrating an exemplified method for monitoring the state of a powertrain or tower of a wind turbine.

FIG. 3 shows a flowchart for illustrating a method 40 for monitoring the state of a powertrain or tower of a wind turbine according to embodiments. Here, the wind turbine 10 can be the wind turbine 10 from FIGS. 1 and 2, for example.

According to a box 41, the method has a detecting of data of a state monitoring system, wherein the state monitoring system is provided for a structure of the wind turbine 10 which is mechanically coupled to the powertrain or tower. The data detected can particularly be vibration data. According to a box 42, the method has a processing of the detected data of the state monitoring system which is provided for the structure of the wind turbine 10 that is mechanically coupled to the powertrain or tower. According to a box 43, the method has a determining of a state of the powertrain or tower from the processed data of the state monitoring system which is provided for the structure of the wind turbine 10 which is mechanically coupled to the powertrain or tower.

It should be noted at this point that the aspects and embodiments described herein can be combined with each other and that individual aspects can be left out there where it is expedient and possible within the scope of the action by the person skilled in the art. Modifications and additions of the aspects described herein are known to the person skilled in the art.

The invention claimed is:

1. A method for monitoring the state of a powertrain or tower of a wind turbine, wherein the method comprises:
   detecting data of a state monitoring system, wherein the state monitoring system is provided for a structure of the wind turbine which is mechanically coupled to the powertrain or tower;
   processing the detected data of the state monitoring system which is provided for the structure of the wind turbine which is mechanically coupled to the powertrain or tower; and
   determining a state of the powertrain or tower from the processed data of the state monitoring system which is provided for the structure of the wind turbine which is mechanically coupled to the powertrain or tower, wherein the detected data include vibration data on the powertrain or the tower, and wherein the vibration data is measured in a rotor of the wind turbine.

2. The method according to claim 1, wherein the state monitoring system has at least one sensor which is arranged on the structure, in particular wherein the sensor comprises a fiber optical sensor.

3. The method according to claim 2, wherein the processing of the data includes a determination of natural frequencies.

4. The method according to claim 3, wherein natural frequencies are classified as powertrain natural frequencies or tower natural frequencies and are monitored for change.

5. The method according to claim 4, wherein a change in an amplitude and/or a mode shape of the natural frequencies is monitored.

6. The method according to claim 1, wherein the processing of the data includes a determination of natural frequencies.

7. The method according to claim 6, wherein natural frequencies are classified as powertrain natural frequencies or tower natural frequencies and are monitored for change.

8. The method according to claim 7, wherein a change in an amplitude and/or a mode shape of the natural frequencies is monitored.

9. A wind turbine, comprising:
   a powertrain and a tower;
   a state monitoring system, wherein the state monitoring system is provided for a structure of the wind turbine which is mechanically coupled to the powertrain or tower; and
   a data processing device which is configured to carry out the method according to claim 1, wherein the state monitoring system has at least one sensor arranged on the structure, wherein the sensor comprises a vibration sensor configured to detect data including vibration data on the powertrain or the tower, and wherein the vibration data is measured in a rotor of the wind turbine.

10. The wind turbine according to claim 9, wherein the sensor comprises a fiber optical sensor.

11. The wind turbine according to claim 9, wherein the sensor comprises a 2D or 3D acceleration sensor.

12. The wind turbine according to claim 9, wherein the structure is at least one rotor blade, a rotor or a hub of the wind turbine.

13. A wind turbine, comprising:
   a powertrain, a tower, a hub, a rotor, and at least one rotor blade mechanically coupled together;
   a state monitoring system, wherein the state monitoring system includes at least one sensor; and
   a data processing device that is configured to:
   detect data of the state monitoring system via the at least one sensor;

process the detected data of the state monitoring, where the data includes one or more of natural frequencies, vibration data, and acceleration data; and determine a state of the powertrain or tower from the processed data of the state monitoring, wherein the sensor comprises a vibration sensor configured to detect data including vibration data on the powertrain or the tower, and wherein the vibration data is measured in the rotor of the wind turbine.

14. The wind turbine according to claim 13, where the at least one sensor is arranged on at least one of the hub, the rotor, or the at least one rotor blade.

15. The wind turbine according to claim 13, where the at least one sensor comprises a plurality of sensors.

16. The wind turbine according to claim 15, where each of the plurality of sensors is arranged in location a on at least one of the hub, the rotor, or the at least one rotor blade in a location different from other of the plurality of sensors.

* * * * *